United States Patent

Greiner et al.

[11] 4,185,675
[45] Jan. 29, 1980

[54] VEHICLE TIRES

[75] Inventors: Henri Greiner, Conflans Ste. Honorine; Claude A. Lefaucheur, Paris, both of France

[73] Assignee: Pneumatiques, Caoutchouc Manufacture et Plastiques Kleber-Colombes, France

[21] Appl. No.: 880,173

[22] Filed: Feb. 22, 1978

[51] Int. Cl.² .............................. B60C 5/08
[52] U.S. Cl. .............................. 152/354 R
[58] Field of Search ............... 152/354, 355, 356, 357

[56] References Cited

U.S. PATENT DOCUMENTS 3,934,634   1/1976   Verdier .................. 152/354

FOREIGN PATENT DOCUMENTS 1342822   3/1964   France .................. 152/354

Primary Examiner—Bruce H. Stoner, Jr.
Assistant Examiner—Gene A. Church
Attorney, Agent, or Firm—Brisebois & Kruger

[57] ABSTRACT

The present invention relates to vehicle tires of the kind having a crown belt formed from at least one pair of plies made of cords which are orientated in directions which intersect at small angles, and having sidewalls each reinforced by at least one strong half-ply making up a carcass which is interrupted under the belt.

The invention which consists in a combination of the following features:

(a) the tire has a low cross-section in which the ratio of height over width is less than 0.8, for example between 0.3 and 0.7, and,
(b) the half carcass-plies are connected together in the area of the tire crown of the tire by a layer which has a strength of less than 50 daN per centimeter of width for an extension of 10% and whose elastic extensibility is at least 10%.

4 Claims, 5 Drawing Figures

VEHICLE TIRES

BACKGROUND OF THE INVENTION

The present invention relates to tires of the kind having a crown belt and flexible sidewalls, which are intended for vehicles capable of travelling at high or very high speeds, such as touring, sports or competition vehicles.

Tires of this kind generally have a radial carcass comprising one or more plies which extend continuously from one bead of the tire to the other, and a crown belt which consist of at least one pair of plies formed from cables orientated in opposite directions at small angles of the order of 10° to 30°, to the longitudinal direction, said belt confining the crown of the carcass over a width approximately equal to the width of the tread surface.

With a construction of this type, the crown of the tire is relatively stiff owing to the fact that it is reinforced both by the bias cord crown plies of the belt and by the underlying portion or portions of the plies of the carcass, whose cords extend transversely, the whole forming a triangulated structure. This stiffness in the crown helps to reduce wear on the tread and the drift resulting from side forces (centrifugal force on bends, sidewinds, camber). On the other hand it has an unfavorable effect on the ride given by the tire on bad roads since it will not allow the crown of the tire to adapt to the irregularities of the surface as well as can an unbelted tire having a conventional cross-ply carcass. Thus, if a tire having a crown belt is to give a good ride, it must have sidewalls which are highly flexible vertically, which is achieved with the radial carcass.

However, the trend for some years has been to use, for high and very high speed vehicles, tires of lower cross-section than in the past, that is tires in which the cross-sectional ratio H/G is between 0.3 and 0.8. There were various reasons for this: to lower the centre of gravity of the vehicle to which the tires were fitted, to provide or retain in the wheels sufficient room to accommodate brake drums or discs, to improve certain characteristics of the behaviour of the tires, such as recovery from bends, or again to increase safety by reducing the distance of collapse in the event of a sudden blow-out.

In these tires of low cross-section, the crown belt is under a relatively greater tension from the inflation pressure, and is thus stiffer and less conductive to a good ride than in tires of high cross-section, with the result only by increasing still further the vertical flexibility of the sidewalls can it be ensured that the tire still gives a good overall ride. However, there is little scope for improvement in this direction, on the one hand due to the small height of the sidewalls, which reduces the amplitude of their flexing, and on the other because of the need to preserve transverse stability to counteract the wobbling or sideways swaying movement which is observed when the sidewalls are too flexible.

It is an object of the invention to minimise or overcome these disadvantages and of thus obtaining belted low cross-section tires for the uses presently concerned which give a better standard of ride and retain good lateral stability: the invention adopts a manner of construction in which the carcass is confined essentially to the sidewalls of the tire, said carcass being interrupted in the central zone of the crown, where the reinforcement is provided essentially by a belt formed from at least one pair of plies made of cords which intersect at small angles.

This construction had already been proposed in the early years of radial tires, with the object of remedying the poor ride caused by triangulated crown reinforcements (see for example French patent specification No. 1,187,693 in the name of Pneumatiques Caoutchouc Manufacture Et Plastiques Kleber-Colombes. This construction was not however adopted by the industry, in particular because, since the tires then involved had a high cross-sectional ratio greater than 0.8 and the belt was under relatively little tension in the circumferential direction, the crown of the carcass adjacent the belt was still necessary and useful to give the belt adequate stiffness when the belt was only formed by oblique cross-plies. When on the other hand what are involved are tires of low cross-section, where the belt is under more tension, calculations and experience show that the part of the carcass underlying the belt is either not stressed transversely or is so little stressed transversely that it contributes substantially nothing to the road-going qualities of the tire.

SUMMARY OF THE INVENTION

For achieving the above and further objects, the invention consists in a vehicle tire having a crown belt formed from at least one pair of plies made of cords which are orientated in directions which intersect at small angles, and having sidewalls each reinforced by at least one strong half-ply making up a carcass which is interrupted under the belt, wherein (a) the tire has a low cross-section in which the ratio of height over width is less than 0.8, and (b) the half carcass-plies are connected together in the area of the tire crown of the tire by a layer which has a strength of less than 50 daN per centimeter of width for an extension of 10% and whose elastic extensibility is at least 10%.

BRIEF DESCRIPTION OF THE DRAWINGS

In order that the invention may be more clearly understood, reference will now be made to the accompanying drawings which show certain embodiments thereof by way of example only, and in which.

DETAILED DESCRIPTION OF PREFERRED EMBODIMENTS

Figure 1:
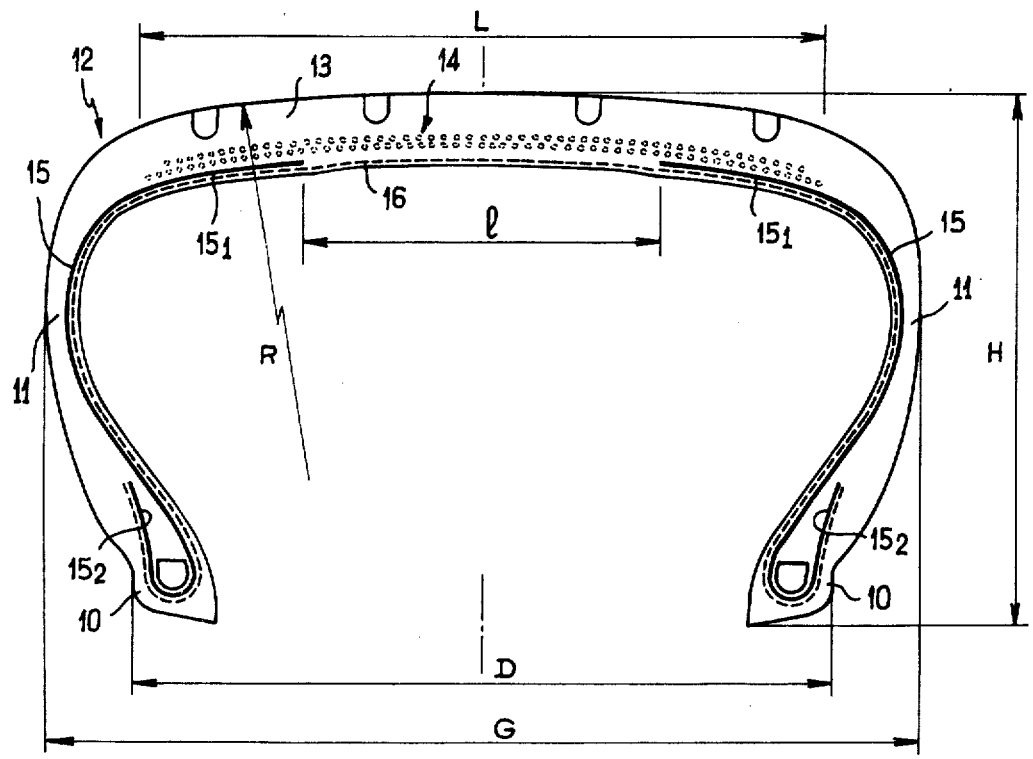
FIGS. 1 and 2 are cross-sectional views respectively of two embodiments of tire, one of which has a radial carcass and the other a cross-ply carcass.

In broad terms, the tires illustrated in the drawings have spaced beads or heels 10 intended to seat the tires on the edges of the rims for them, outwardly cambered sidewalls 11, and a crown 12 which includes a tread 13, which contains a pattern appropriate to the use for which the tire is intended. The width L of the tread is approximately equal to the distance D between the beads of the tire when mounted on its rim. The tires shown each have a low cross-section in which the ratio of the cross-sectional height H over the width G of the tire is less than 0.8 and is preferably between 0.3 and 0.7. The crown of each tire is reinforced by a belt 14 positioned under the tread 13 which extends transversely for approximately the width L of the tread surface. This belt is substantially inextensible in the circumferential direction so that it will confine the crown of the tire and restrict its outside diameter when it inflated. The belt comprises at least one pair of superimposed plies of rubberised fabric made of parallel flexible cords orientated in intersecting directions which form small angles with the longitudinal direction, i.e. angles of the order of approximately 10° to 30°.

The cords of these belt plies are selected to give the belts of the various tires the required strength in the circumferential direction and adequate stiffness in their own plane. They may be made from one of the conventional materials such as artifical or synthetic textiles (rayon, nylon, polyester, aromatic polyamide) of glass fibre, or of metal for example. When the tire is in the normally inflated state, the belt and the tread surface take on a form in which they are slightly curved outwards, with a transverse radius of curvature R which is greater than the outside radius of the tire, which ensures that the pressure from contact with the ground is well distributed and that the wear on the tread is uniform.

The tire in FIG. 1 is of the radial-ply type whose sidewalls 11 are each reinforced by a strong half carcass-ply 15 of rubberised fabric whose cords are orientated in radial planes. These half carcass-plies 15 are confined substantially to the side-walls 11 in the sense that their upper edges 15.1 extend into the lateral zones of the crown of the tire only for the distance necessary to provide good anchoring to the crown. The extremities of these upper edges 15.1 are spaced apart in the central zone of the crown by a distance 1 at least equal to one third of the width of the belt. The anchoring is achieved by the adhesion between the superimposed edges of the carcass plies and of the belt. The lower edges 15.2 of the half carcass-plies are extended to allow them to be fastened in place in the beads by folding them around the circular bead wires.

In this tire, the strong half plies 15 of the carcass are supported and connected to one another in the area of the crown by a thin supporting layer 16 of low strength and great elastic extensibility, which extends continuously from one bead 10 to the other with its edges folded around the bead wires. This thin supporting layer 16 is made for example from light rubberised fabric formed from parallel flexible cords orientated in radial planes of the tire.

The term "strong" which is used to qualify the half carcass-plies means, both here and in what follows, that these half plies 15 are made from high modulus cords which show little extension under load so that the plies 15 themselves, independantly of the supporting layer 16, will provide the sidewalls with resistance to the inflation pressure and to external impacts and with good road-going qualities. Use may be made for example of cords of rayon, stretch nylon, polyester, aromatic polyamide, glass or metal. These cables are grouped together in parallel in calendered plies in the proportion of 15 to 30 cords per 25.4 cm of width so that the plies have, in the direction of the cords, a strength higher than 10 daN per centimeter of width for an extension of 1% and a breaking strength of higher than 100 daN per centimeter of width of the ply. Conversely, the expression "thin supporting layer of low strength and great elastic extensibility" means, both here and in what follows, that the said layer does not itself have adequate strength, comparable to that of a carcass, to give the tire the requisite properties of strength and road behaviour, the function allotted to this layer being to support and/or join together the half plies 15, in particular for ease of manufacture. In practice the thickness of this supporting layer 16 is small, of the order of 1 to 2 mm, its strength is less than 50 daN per centimeter of width at an extension of 10%, and its elastic extensibility is at least 10%.

As a consequence, in the construction of the tire described with reference to FIG. 1, the interruption of the carcass plies 15 in the central zone of the crown of the tire means that in essence this central zone is reinforced only by the corresponding central part of the belt 14 made of oblique, untriangulated cross-plies. The radial flexibility of this central zone is greater than that of the lateral parts of the crown, which enables it better to adapt to small asperities or irregularites on the road and to increase the standard of the ride to bring it up to an acceptable level despite the low height and small amplitude of flexing of the sidewalls 11. The low strength and high extensibility of the supporting ply 16 make it possible not to interfere with the flexibility of the crown.

Figure 2:
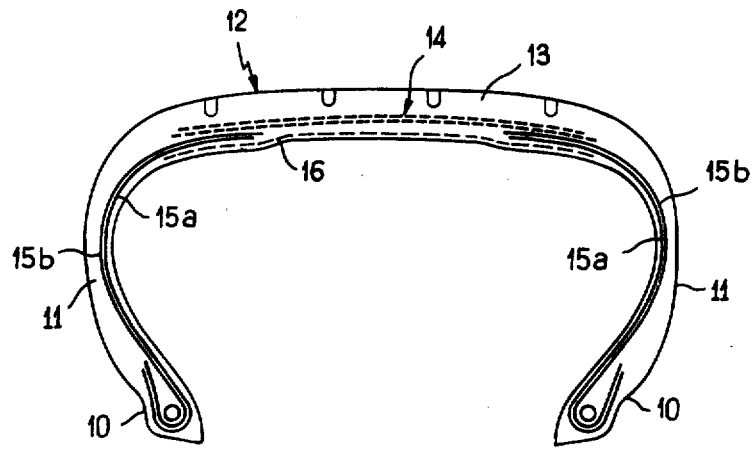

The tire illustrated in FIG. 2 is also a tire having a crown belt, similar to the previous tire, but it has a carcass of the cross-ply type. In this case each sidewall is reinforced by at least two superimposed strong half-plies 15a, 15b which extend from the beads 10 to the marginal areas of the crown belt 14. These half carcass-plies are formed from high modulus cords orientated in intersecting directions which form either retively large angles of the order of 70° to 85°, i.e. the cords are almost radial, or smaller angles of the order of 45° to 60°, as conventional tires having cross or diagonal ply carcasses. These half carcass-plies 15a, 15b are joined together by a supporting ply 16 of low strength and high extensibility, which in the present embodiment is smaller in width, being restricted to approximately the width of the tread surface. This ply 16 is formed for example, as before, from light rubberised fabric made of cords orientated in radial planes of the tire. The crossed half plies of the carcass produce sidewalls whose radial flexibility is less but the poorer ride which results is compensated for in the present case, at least in part, by the greater radial flexibility of the crown. On the other hand, the crossed arrangement of the half carcass-plies increases the strength of the sidewalls and reduces their susceptibility to impact.

Figure 3:
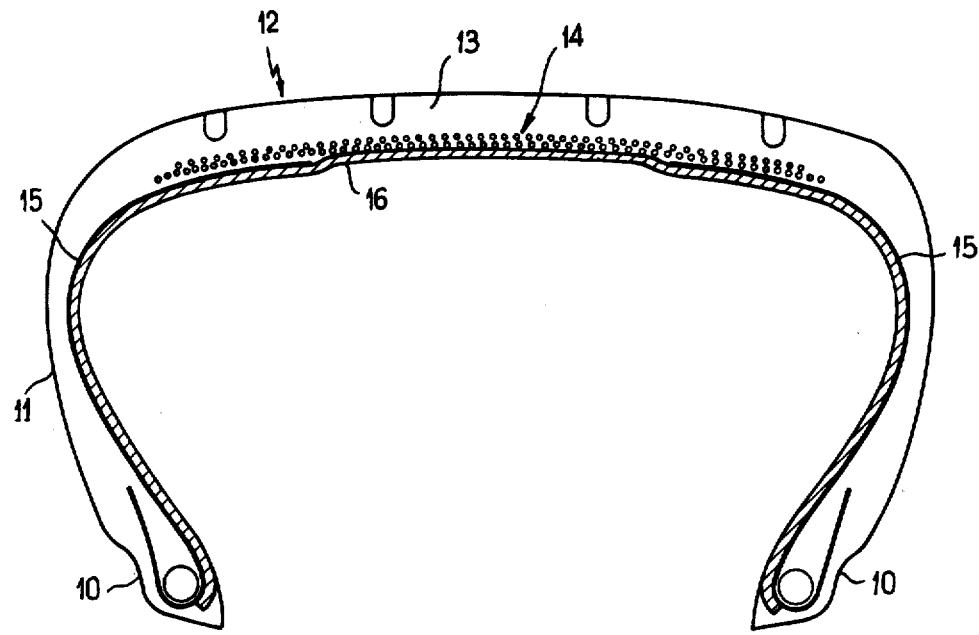
FIG. 3 is a cross-sectional view illustrating a third embodiment.

FIG. 3 shows another embodiment which is similar to that of FIG. 1 but in which the half-plies 15 of the radial carcass for reinforcing the sidewalls are superimposed on a thin and continuous supporting layer 16 made of an elastic rubbery mixture reinforced by one of the conventional fillers or by discontinuous fibres. This supporting layer 16 extends from one bead of the tire to the other. Its thickness is small, of the order of 1 to 2 mm, and its strength is from 1 to 10 daN per centimeter of width at 10% extension.

Figures 4, 5:
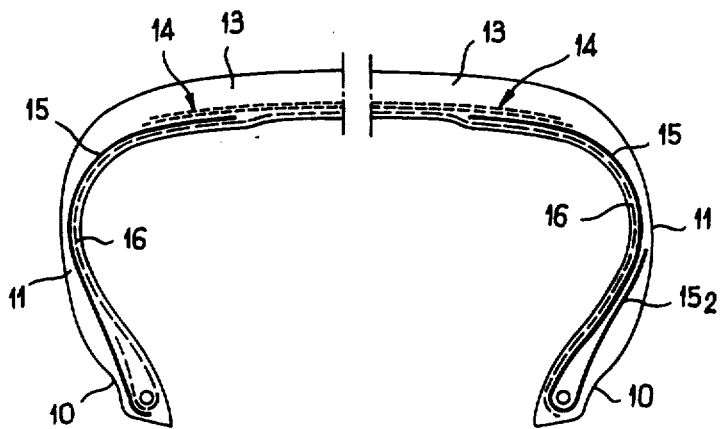
FIGS. 4 and 5 are half cross-sections through further embodiments, illustrating other features.

FIGS. 4 and 5 show other embodiments derived from FIG. 1 in which means are provided to increase lateral stability, that is to say the resistance of the sidewalls to wobbling or swaying movements. In FIG. 4 the supporting layer 16 has its edges folded around the bead wires from the inside outwards, while in the region of the beads the half carcass-plies 15 are arranged on the outside of the folded edges of the supporting layer.

The lower edges of the half-plies 15 may be folded from the inside outwards around the bead wires to a greater or lesser extent. In FIG. 5 the half carcass plies 15 have folded edges 15.2 which extend up for at least half the height of the sidewalls.

The folded edges 15.2 stiffen the lower parts of the sidewalls near the beads but leave more flexible zones in the upper half, to which the flexing of the sidewalls is chiefly confined.

We claim:

1. A vehicle tire having a low cross-section in which the ratio of height over width is less than 0.8, a crown including a tread and a crown belt formed from at least two plies made of cords which are oriented in directions which intersect at small angles, beads, side walls which are each reinforced by at least one strong half-carcass ply which extends from a respective said bead to a lateral region of said crown, said half-carcass ply being interrrupted beneath said crown belt and being separated between the lateral regions of said crown by a distance which is equal to at least one third of the width of said crown belt, and a supporting layer which interconnects said half-carcass plies between the lateral regions of said crown, which has a strength of less than 50 daN per centimeter of width for an extension of 10% and whose elastic extensibility is at least 10%.

2. A tire according to claim 1 wherein said ratio between height and width lies between 0.3 and 0.7.

3. A tire according to claim 1, wherein said sidewalls are each reinforced by at least two strong half carcass-plies formed from oblique crossed cords, and said supporting layer has a width which is approximately equal to the width of the tread surface.

4. A tire according to claim 3, wherein said supporting layer is made of an elastic rubbery mixture and has a thickness of 1 to 2 mm and a strength of 1 to 10 daN per centimeter of width at 10% extension.

* * * * *